United States Patent
Atwood et al.

(10) Patent No.: US 6,871,640 B2
(45) Date of Patent: Mar. 29, 2005

(54) SADDLE TANK SIPHON PRIMER

(75) Inventors: Jeffrey M. Atwood, Orange, CT (US); Daniel A. Gilmour, West Hartford, CT (US)

(73) Assignee: TI Group Automotive Systems, Inc., Warren, MI (US)

( * ) Notice: Subject to any disclaimer, the term of this patent is extended or adjusted under 35 U.S.C. 154(b) by 79 days.

(21) Appl. No.: 10/391,973

(22) Filed: Mar. 18, 2003

(65) Prior Publication Data

US 2004/0182454 A1 Sep. 23, 2004

(51) Int. Cl.[7] .......................... F02M 37/04; F16L 43/00
(52) U.S. Cl. ...................... 123/509; 137/142; 137/127; 137/574
(58) Field of Search ................................. 123/509, 514, 123/516, 198 D; 137/127, 142, 147, 143, 565, 22, 587, 574

(56) References Cited

U.S. PATENT DOCUMENTS

| | | |
|---|---|---|
| 2,953,156 A | 9/1960 | Bryant |
| 3,083,720 A | 4/1963 | Cartwright |
| 4,579,139 A | 4/1986 | Stouffer |
| 4,834,132 A | 5/1989 | Sasaki et al. |
| 4,838,307 A | 6/1989 | Sasaki et al. |
| 4,860,714 A * | 8/1989 | Bucci ........................ 123/514 |
| 4,907,616 A * | 3/1990 | Bergsma ..................... 137/38 |
| 4,930,537 A | 6/1990 | Farmer |
| 4,951,699 A | 8/1990 | Lipman |
| 5,040,516 A | 8/1991 | Haraguchi |
| 5,078,169 A | 1/1992 | Scheurenbrand et al. |
| 5,170,764 A | 12/1992 | Tuckey |
| 5,197,443 A * | 3/1993 | Hodgkins ................... 123/514 |
| 5,289,810 A | 3/1994 | Bauer et al. |
| 5,732,684 A | 3/1998 | Thompson |
| 5,749,345 A * | 5/1998 | Treml ......................... 123/456 |
| 5,797,377 A * | 8/1998 | Fischerkeller .............. 123/514 |
| 5,979,485 A * | 11/1999 | Tuckey et al. ............. 137/143 |
| 5,983,932 A * | 11/1999 | Wagner et al. ............. 137/587 |
| 6,113,345 A * | 9/2000 | Ashby ........................ 414/801 |
| 6,161,562 A | 12/2000 | Keefer et al. |
| 6,273,131 B1 * | 8/2001 | Kleppner ............... 137/565.22 |
| 6,283,142 B1 * | 9/2001 | Wheeler et al. ............ 137/265 |
| 6,343,589 B1 * | 2/2002 | Talaski et al. ............. 123/514 |
| 6,371,153 B1 | 4/2002 | Fischerkeller et al. |
| 6,712,590 B1 * | 3/2004 | Villela et al. ............ 417/423.9 |
| 2002/0148510 A1 * | 10/2002 | Viebahn et al. ............ 137/574 |

* cited by examiner

*Primary Examiner*—Carl S. Miller
(74) *Attorney, Agent, or Firm*—Reising, Ethington, Barnes & Kisselle, P.C.

(57) ABSTRACT

A fuel delivery system including a fuel tank having multiple sections. A fuel pump is disposed in a first section with an inlet for drawing liquid fuel from the first section and an outlet for supplying the fuel to an engine and to a pick-up disposed in the second section. A siphon line is connected to the pick-up at one end and terminates in the first section at another end. A fuel inlet of the pickup communicates with the siphon line through a valve member that is actuated to open and closed positions. In operation, the fuel pump provides a flow of liquid fuel to the pick-up to purge and prime the siphon line which normally maintains a substantially equal liquid fuel level in the first and second sections of the fuel tank. In some conditions, the valve closes to prevent reverse flow of fuel from the first section to the second section of the tank.

23 Claims, 2 Drawing Sheets

SADDLE TANK SIPHON PRIMER

FIELD OF THE INVENTION

This invention relates generally to fuel delivery systems for internal combustion engines and more particularly to fuel delivery systems with dual fuel tanks or a tank having separate sections.

BACKGROUND OF THE INVENTION

The use of multi-chambered fuel tanks or multiple fuel tanks for vehicles such as trucks, boats or motorcycles is known in the art. For example, the use of a fuel tank having two distinct sections, commonly known as a saddle tank, provides a tank which effectively functions as more than one tank at certain fuel levels. Current fuel delivery systems are designed to draw fuel from each tank, or each distinct section of a tank and deliver the fuel to an engine.

While the fuel delivery systems commonly known in the art are capable of drawing fuel from the different sections within the tank, they often draw the fuel independently and unequally from the various sections. The unequal draw of fuel from various sections of the tank leads to different fuel levels in the tank sections requiring multiple fuel level sensors to monitor the fuel level within the tank. Also, unequal fuel levels may lead to interruption in fuel flow from a pump contained in one of the fuel tank sections. Therefore, there is a need to maintain an equal amount of fuel within both portions of the fuel tank such that a single fuel sensor, as well as a continuous supply of fuel is provided to a fuel pump contained in a single section of the fuel tank.

SUMMARY OF THE INVENTION

A fuel delivery system that maintains equal fuel levels in each section of a fuel tank or within multiple fuel tanks. The fuel delivery system includes a fuel pump with an inlet disposed in a first section of the fuel tank, and a pick-up in a second section of the tank. The fuel pump includes an inlet for drawing liquid fuel from the first section of the tank and an outlet for transferring liquid fuel to an engine. A siphon line is connected to the pick-up at one end and terminates in the first section of the fuel tank at the other end. The fuel pump provides a flow of liquid fuel to the engine, as well as to the pick-up via a fuel supply line whereby the siphon line is primed with liquid fuel to maintain an equal liquid fuel level in the first and second sections of the tank.

To prime the siphon line with liquid fuel a valve member in the pick-up closes, and then opens to allow the siphon transfer of liquid fuel from the second section to the first section of the tank.

Objects, features and advantages of this invention include providing a fuel delivery system that is more efficient when compared with systems currently used in that the pump supplies fuel to the pick-up at a lower flow rate and lower pressure than conventional jet pumps currently used in the industry. The fuel delivery system of the present invention also prevents reverse flow through the siphon line, reduces the number of parts necessary to maintain an equal fuel level in a multiple section fuel tank and is of relatively simple design, economical manufacture and assembly, and in service has a long useful life.

BRIEF DESCRIPTION OF THE DRAWINGS

These and other objects, features and advantages of this invention will be apparent from the following detailed description of the preferred embodiments and best mode, appended claims, and accompanying drawings in which:

DETAILED DESCRIPTION OF THE PREFERRED EMBODIMENTS

Figure 1:
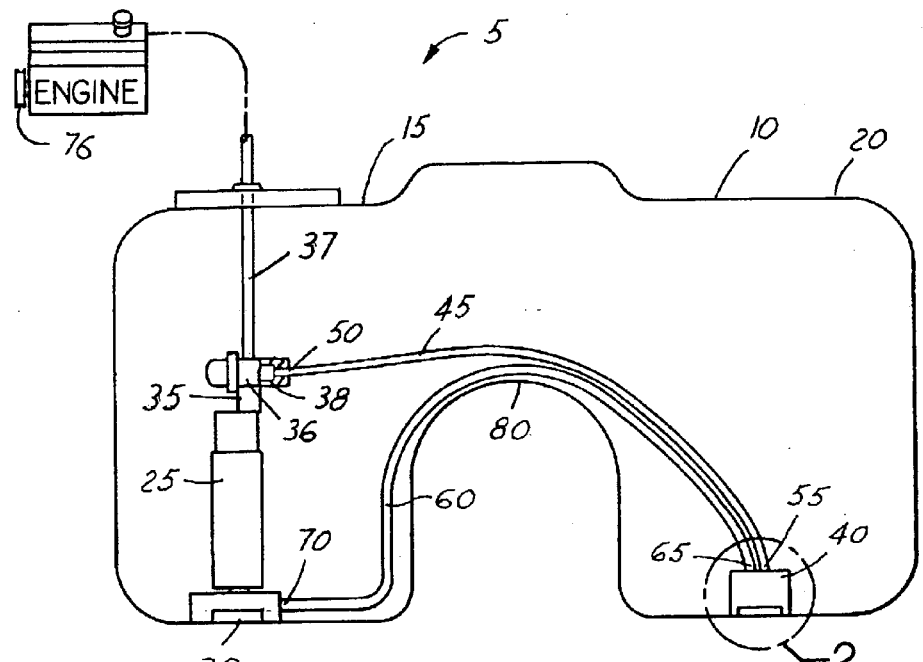
FIG. 1 is an end-sectional view of a saddle-shaped tank with a fuel delivery system embodying the invention.

FIG. 1 illustrates a fuel delivery system 5 for a vehicle that includes separate multiple fuel tanks (not shown), or a fuel tank 10 having two sections 15 and 20. The saddle-shaped fuel tank 10 has an electric fuel pump 25 disposed within the first section 15. The fuel pump 25 includes an inlet 30 for drawing liquid fuel from the fuel tank 10 and an outlet 35 for supplying the liquid fuel to an engine 76 and to a pick-up 40 disposed in the second section 20 of the fuel tank 10. Fuel is supplied to the engine 76 through a tee fitting 36 connected to the pump outlet 35 and a line 37 and to the pick-up 40 through a line 45 connected to the tee fitting 36 at one end 50 and to the pick-up 40 at another end 55. A siphon line 60 is connected to the pick-up 40 at one end 65 and at the other end 70 terminates immediately adjacent the bottom of the first section 15. Preferably the end 70 of the siphon line 60 also terminates immediately adjacent the inlet 30 of the pump 25. The flow of liquid fuel to the pick-up 40 primes the siphon line 60 and removes any vapor and air therein to maintain an equal liquid fuel level in the first 15 and second 20 sections of the fuel tank 10.

Figure 2:
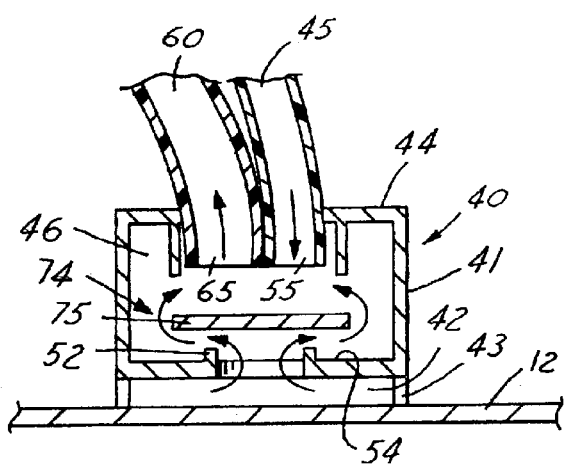
FIG. 2 is a sectional view of a pick-up placed in a section remote from the fuel pump.

As shown in FIG. 2, the pick-up 40 generally comprises a housing 41 having an inlet 42 at the bottom 43 of the housing which is attached to a bottom wall 12 of the fuel tank 10. In one embodiment, the pick-up housing 41 may be integrally formed with the fuel tank, through a plastic molding process or it may be a separate body attached by welding to the bottom wall 12 of the tank. In another embodiment the pick-up housing can be held against the fuel tank with a spring force. The fuel supply line 45 and siphon line 60 enter the pick-up housing 41 at its top 44 and open into a valve compartment 46 of the housing 41. A valve 74 with a closure flap 75 that is capable of actuation between an open position spaced from an annular seat 52 and a closed position bearing on the seat 52 is utilized for priming the siphon line 60 to allow the transfer of liquid fuel from the second section 20 to the first section 15. Preferably the flap 75 is a sheet of a flexible material and is free to move from open and closed positions within the housing 41.

In operation, fuel discharged from fuel supply line 45 into the pick-up housing 41 urges the valve flap 75 to its closed position so that liquid fuel flows from the fuel supply line 45 into the siphon line 60 to purge air and vapor from the siphon line 60 and prime it with liquid fuel so that the siphon line 60 may function as a siphon. The valve flap 75 is urged toward its open position in response to a pressure gradient caused by a higher level of liquid fuel in the second section 20 in relation to the level of liquid fuel in the first section 15. When this pressure gradient is great enough to overcome the force of the flow from the fuel supply line 45, the valve flap 75 moves toward its open position thereby allowing the transfer of the liquid fuel from the second section 20 to the first section 15 through the pick-up housing 41 and the siphon tube 60 such that a substantially equal level of liquid fuel is maintained in both sections.

As shown in FIG. 1, the fuel pump 25 is disposed within the first section 15 of the fuel tank 10 and preferably comprises an electric fuel pump. The outlet 35 of the fuel pump 25 is connected to a tee fitting 36 for transferring liquid fuel through a line 37 to the engine 76, as well as through the line 45 to the pick-up 40 in the second section 20. The portion of the tee fitting 36 providing liquid to the fuel supply line 45 has a restricted orifice 38 sized such that a liquid flow rate of about 5 to 10 liters per hour to the pick-up 40 is achieved. Such a low flow rate does not significantly detract from the amount of fuel that is transferred to the engine, and does not require a separate jet-type pump as is commonly utilized in the art. Therefore, a continuous and substantially constant fuel flow to the pick-up 40 purges and primes the siphon tube 60 to maintain an equal level in each of the sections 15, 20 of the fuel tank 10, without a large and uneconomical transfer of liquid fuel, as with a jet-type pump.

The siphon line 60 is sized such that it is readily purged and primed by a flow rate of 5–10 liters per hour and will transfer sufficient fuel from the second section 20 to the first section 15. The siphon line is, therefore, of such a size that it can accommodate a sufficient flow rate of liquid fuel to maintain an equal level of liquid fuel in the first and second sections 15, 20, as well as be readily purged and primed. Normally the siphon tube 60 will be sized to have a maximum transfer capacity of about 40% to 70% of the maximum fuel demand or consumption of the vehicle engine. The siphon line 60, in a preferred embodiment has an internal diameter of an inch or less.

In operation when the electric pump 25 is energized, it draws fuel from the first section 15 of the tank through its inlet 30 and through its outlet 35 supplies pressurized fuel to both the engine 76 and the valve compartment 46 of the fuel pick-up 40 in the second section 20 of the tank. This pressurized fuel flows through the siphon line 60 to thereby purge it of any fuel vapor and air and primes it with liquid fuel. If and when the level of liquid fuel in the second tank section 20 is sufficiently higher than the level of fuel in the first tank section 15, it will open the check valve 74 and fuel will flow from the second section 20 through the inlet 42 of the pick-up 40 and the siphon line 60 into the first section 15 until the liquid fuel level becomes substantially equal or level in both sections. If for some reason (such as stopping or parking on an incline or turning a sharp curve) the fuel level in the first section 15 becomes substantially higher than the fuel level in the second section 20, the pressure differential transmitted through the siphon line 60 will insure closure of the check valve 74 thereby preventing a reverse flow which would transfer fuel from the first section 15 to the second section 20, which under some circumstances (such as low fuel levels) could deprive or starve the pump 25 of fuel at its inlet 30 even though there is sufficient liquid fuel in the tank 10.

As another aspect of the present invention, there is disclosed a method of delivering fuel to an engine while maintaining a substantially equal fuel level in a fuel tank having two sections. The method includes the step of supplying liquid fuel from the first section to the engine and to a siphon line connected to a fuel pick-up in the second section. The pressurized fuel enters the siphon line through the pick-up to prime the siphon line and purge fuel vapor and air from the siphon line. Liquid fuel is then transferred through the siphon line from the second section to the first section to maintain a substantially equal level of fuel in the first and second sections.

Figure 3:
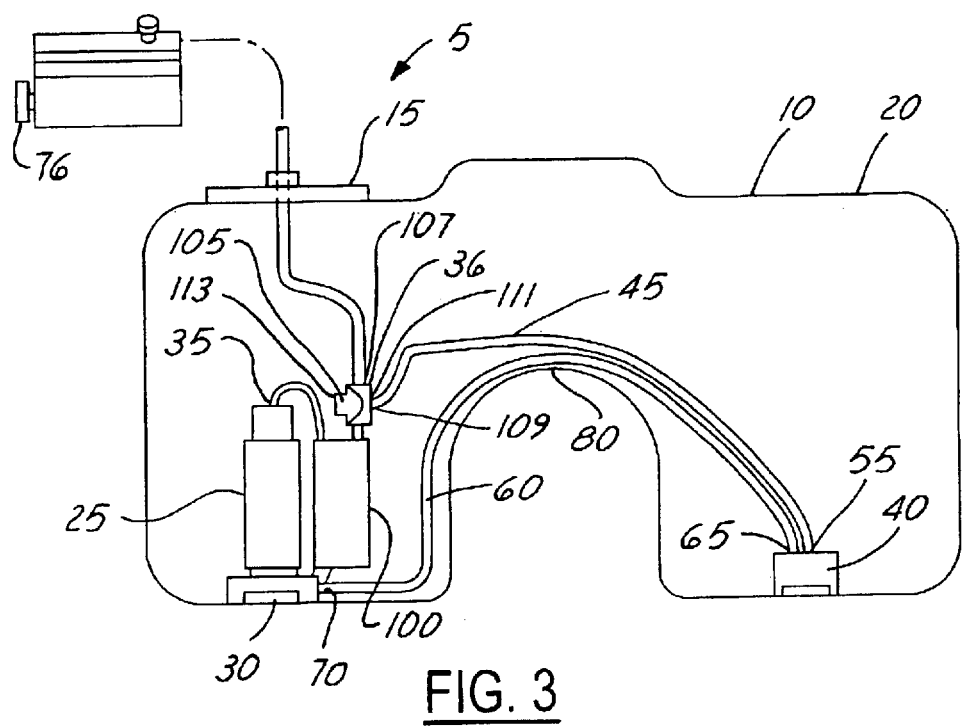
FIG. 3 is an end sectional view of a saddle-shaped tank with an alternative embodiment of the fuel delivery system of the present invention.

In an alternative embodiment shown in FIG. 3, the fuel pump outlet 35 is connected to a fuel filter 100, which in turn is connected to a pressure regulator 105. The pressure regulator 105 delivers fuel to the engine through a delivery end 107 and to a tee 36 through the exhaust end 109. The tee 36 is connected to the fuel line 45 at one port 111 of the tee 36 and deposits liquid fuel back into the first section 15 of the fuel tank 10 at the second part 113 of the tee 36. As with the previously disclosed embodiment, a siphon line 60 is connected to the pick-up 40 at one end 65 and at the other end 70 communicates immediately adjacent the inlet 30 of the pump 25. The pick-up 40, described above, operates in the same manner as with the first embodiment.

In use, the regulator exhaust 109 provides liquid fuel to the line 45, thereby priming the siphon line 60 to maintain an equal liquid fuel level in the first 15 and second 20 sections of the fuel tank 10. The utilization of the regulator exhaust eliminates the parasitic loss of fuel to the engine 76 that may occur when liquid fuel is tapped from the supply line 37 leading to the engine 76. The flow of liquid fuel through the exhaust end 109 of the pressure regulator 105 will vary inversely with the flow to the engine 76 based on the engine demand.

A valve contained in the pick-up housing is activated to a closed position if there is a higher fuel level in the first section in relation to the second section. The closed valve prevents liquid fuel from flowing from the first section to the second section via the siphon tube to prevent reverse siphoning of fuel into the second section.

While preferred embodiments are disclosed, a worker in this art would understand that various modifications would come within the scope of the invention as defined by the following claims.

We claim:

1. A fuel delivery system comprising:
   (a) a fuel tank having at least two sections;
   (b) a fuel pump disposed in a first section, the fuel pump having an inlet for drawing liquid fuel from the fuel tank and an outlet for transferring the liquid fuel to an engine and to a pick-up;
   (c) a pick-up disposed in the second section;
   (d) a fuel supply line connected to the outlet of the fuel pump at one end and to the pick-up at another end;
   (e) a siphon line connected to the pick-up at one end and terminating in the first section at another end; and
   (f) the fuel pump providing a flow of liquid fuel to the engine as well as to the pick-up, whereby the siphon line is primed with a liquid fuel to normally provide a substantially equal liquid fuel level in the first and second sections.

2. The fuel delivery system of claim 1 wherein the pick-up further includes a valve member capable of actuation between open and closed positions for allowing the siphon line to transfer liquid fuel from the second section to the first section and inhibiting the transfer of liquid fuel from the first section to the second section.

3. The fuel delivery system of claim 2 wherein the valve member comprises a flapper valve.

4. The fuel delivery system of claim 1 wherein the siphon flows in a single direction from the second section to the first section.

5. The fuel delivery system of claim 1 wherein the fuel pump comprises an electric fuel pump.

6. The fuel delivery system of claim 1 wherein the pick-up is integrally formed with the fuel tank.

7. The fuel delivery system of claim 1 wherein the pick-up comprises a housing having an inlet at a bottom of the housing and wherein the housing is disposed at a bottom of the fuel tank.

8. The fuel delivery system of claim 7 wherein the fuel supply and siphon lines enter the housing at a top of the housing.

9. The fuel delivery system of claim 7 wherein a flapper valve is disposed within the housing and engages a seat formed on a lower inner surface of the housing thereby inhibiting reverse flow of fuel through the siphon line into the second section.

10. The fuel delivery system of claim 9 wherein the flapper valve disengages the seat formed on the lower inner surface of the housing to allow transfer of liquid fuel to equalize the level of liquid fuel in each section in response to a pressure gradient caused by a higher level of liquid fuel in the second section in relation to the liquid fuel level of the first section.

11. The fuel delivery system of claim 9 wherein an upper inner surface of the housing further includes a stop preventing the flapper valve from blocking the flow of the liquid fuel from the fuel supply and siphon lines.

12. The fuel delivery system of claim 1 wherein the siphon line is sized such that it maintains its prime, as well as accommodates a sufficient flow rate of liquid fuel to maintain a substantially equal level of liquid fuel in the two sections.

13. The fuel delivery system of claim 12 wherein the siphon line has an internal diameter one inch or less.

14. The fuel delivery system of claim 1 wherein the outlet of the fuel pump includes a tee with one portion of the tee providing liquid fuel to the engine, while another portion of the tee provides liquid fuel to the fuel supply line.

15. The fuel delivery system of claim 1 wherein said at least two tank sections comprise at least two separate fuel tanks.

16. A fuel delivery system comprising:
(a) a fuel tank having at least two sections;
(b) a fuel pump disposed in one of the sections, the fuel pump having an inlet disposed adjacent a bottom of the fuel tank;
(c) a pick-up disposed in another of the sections remote from the fuel pump, the pick-up disposed adjacent a bottom of the fuel tank, the pick-up including a check valve;
(d) a fuel supply line connected at one end to the fuel pump and at another end to the pick-up, the fuel pump supplying liquid fuel via the supply line from the section containing the fuel pump to the section containing the pick-up;
(e) a siphon line connected to the pick-up at one end and terminating in the section containing the fuel pump at another end; and
(f) the fuel pump providing a continuous flow of liquid fuel to the pick-up, to purge and prime the siphon line, the check valve opening to allow transfer of liquid fuel from the second section to the first section and closing to prevent reverse flow from the first section to the second section.

17. The fuel delivery system of claim 1 wherein the fuel tank comprises a saddle tank having two sections.

18. A method of delivering fuel to an engine from a fuel tank having two sections, a first section including a fuel pump and the second section including a pick-up, the pick-up having a housing, the fuel pump and pick-up connected via a fuel supply line and the pick-up connected to a siphon line at one end and terminating in the first section at another end, the method comprising the steps of:
(a) transferring liquid fuel from the fuel pump in the first section via the supply line to the pick-up in the second section and to an engine via an engine supply line;
(b) priming the siphon line with the transferred liquid fuel purging any fuel vapor and air from the siphon line; and
(c) transferring liquid fuel from the second section to the first section such that a substantially equal level is maintained in the first and second sections.

19. The method of claim 18 further including the step of providing a sufficient flow of liquid fuel to the engine.

20. The method of claim 18 wherein a valve is actuated in the valve housing to a closed position in response to a greater liquid fuel level in the first section than in the second section whereby reverse siphoning is prevented.

21. A fuel delivery system comprising:
(a) a fuel tank having two sections;
(b) a fuel pump disposed in a first section, the fuel pump having an inlet for drawing liquid fuel from the fuel tank and an outlet for transferring the liquid fuel through a filter, to a pressure regulator and then to an engine and to a pick-up;
(c) a pick-up disposed in the second section;
(d) a fuel supply line connected to a tee at the exhaust of the regulator at one end, and to the pick-up at another end;
(e) one portion of the tee ports the exhaust fuel to the supply line for the pick-up, the other portion of the tee ports fuel into the first section;
(f) a siphon line connected to the pick-up at one end and terminating in the first section at another end; and
(g) the fuel pump providing a flow of liquid fuel to the engine as well as to the pick-up, whereby the siphon line is primed with liquid fuel to normally provide a substantially equal liquid fuel level in the first and second sections.

22. The fuel delivery system of claim 21 wherein said two tank sections comprise at least two separate fuel tanks.

23. The fuel delivery system of claim 16 wherein said at least two tank sections comprise at least two separate fuel tanks.

* * * * *